United States Patent
Hung

(10) Patent No.: US 8,939,657 B2
(45) Date of Patent: Jan. 27, 2015

(54) OPTICAL CONNECTOR WITH SLOPED SURFACE

(71) Applicant: Hon Hai Precision Industry Co., Ltd., New Taipei (TW)

(72) Inventor: Yi Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 90 days.

(21) Appl. No.: 13/730,784

(22) Filed: Dec. 28, 2012

(65) Prior Publication Data

US 2014/0169746 A1 Jun. 19, 2014

(30) Foreign Application Priority Data

Dec. 14, 2012 (TW) .............................. 101147567 A

(51) Int. Cl.
   *G02B 6/43* (2006.01)
   *G02B 6/42* (2006.01)

(52) U.S. Cl.
   CPC ................ *G02B 6/42* (2013.01); *G02B 6/4292* (2013.01); *G02B 6/4214* (2013.01)
   USPC .............................................. 385/89; 385/93

(58) Field of Classification Search
   None
   See application file for complete search history.

(56) References Cited

U.S. PATENT DOCUMENTS

| | | | | |
|---|---|---|---|---|
| 5,515,468 A | * | 5/1996 | DeAndrea et al. ............... | 385/88 |
| 6,491,447 B2 | * | 12/2002 | Aihara ............................. | 385/92 |
| 7,066,657 B2 | * | 6/2006 | Murali et al. .................... | 385/92 |
| 7,198,416 B2 | * | 4/2007 | Ray et al. ......................... | 385/93 |
| 7,298,941 B2 | * | 11/2007 | Palen et al. ...................... | 385/33 |
| 7,399,125 B1 | * | 7/2008 | Whaley et al. .................. | 385/92 |
| 7,441,965 B2 | * | 10/2008 | Furuno et al. ................... | 385/93 |
| 8,641,296 B2 | * | 2/2014 | Nishimura ....................... | 385/92 |
| 2004/0202477 A1 | * | 10/2004 | Nagasaka et al. ............. | 398/138 |
| 2004/0258354 A1 | * | 12/2004 | Sekiya et al. ................... | 385/35 |
| 2005/0141823 A1 | * | 6/2005 | Han et al. ........................ | 385/89 |
| 2006/0159405 A1 | * | 7/2006 | Yajima ............................. | 385/88 |
| 2008/0166136 A1 | * | 7/2008 | Birincioglu et al. .......... | 398/212 |
| 2009/0252455 A1 | * | 10/2009 | Ohta et al. ....................... | 385/42 |
| 2012/0027345 A1 | * | 2/2012 | Castagna et al. ................ | 385/33 |
| 2012/0114289 A1 | * | 5/2012 | DeMeritt et al. ................ | 385/79 |
| 2013/0343698 A1 | * | 12/2013 | Ko .................................... | 385/14 |

FOREIGN PATENT DOCUMENTS

KR    10-2006-0054914 A    *    5/2006

* cited by examiner

*Primary Examiner* — Mike Stahl
(74) *Attorney, Agent, or Firm* — Novak Druce Connolly Bove + Quigg LLP

(57) ABSTRACT

An optical connector includes a printed circuit board (PCB), an optical-electric coupling element, and a jumper detachably attached to the optical-electric coupling element. The optical-electric coupling element is positioned on the PCB. The optical-electric coupling element includes at least two first coupling lenses and a sloped surface. The optical-electric coupling element defines a stepped receiving cavity in its sidewall. A bottom surface of the stepped receiving cavity forms at least two second coupling lenses. The jumper is detachably inserted into the stepped receiving cavity, and the jumper has at least two receiving holes receiving at least two optical fibers. Each optical fiber is optically aligned with a respective second coupling lens. Each second coupling lens is optically aligned with a respective first coupling lens via the sloped surface.

10 Claims, 4 Drawing Sheets

OPTICAL CONNECTOR WITH SLOPED SURFACE

BACKGROUND

1. Technical Field

The present disclosure relates to optical connectors, and particularly to an optical connector which has a sloped surface.

2. Description of Related Art

Optical connectors typically include a photoelectric conversion chip, such as a laser diode or a photo diode, and an optical fiber. The photoelectric conversion chip emits or receives light carrying data to or from the optical fiber for data transmission. In certain circumstances, the light path between the photoelectric conversion chip and the optical fiber must be bent about 90 degrees to reduce a length or height of the optical connector. This may be achieved by a reflective mirror tilted at 45 degrees with respect to the photoelectric conversion chip and the optical fiber. However, the essential step of accurately aligning the reflective mirror with the photoelectric conversion chip is a complex and difficult process.

Therefore, it is desirable to provide an optical connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
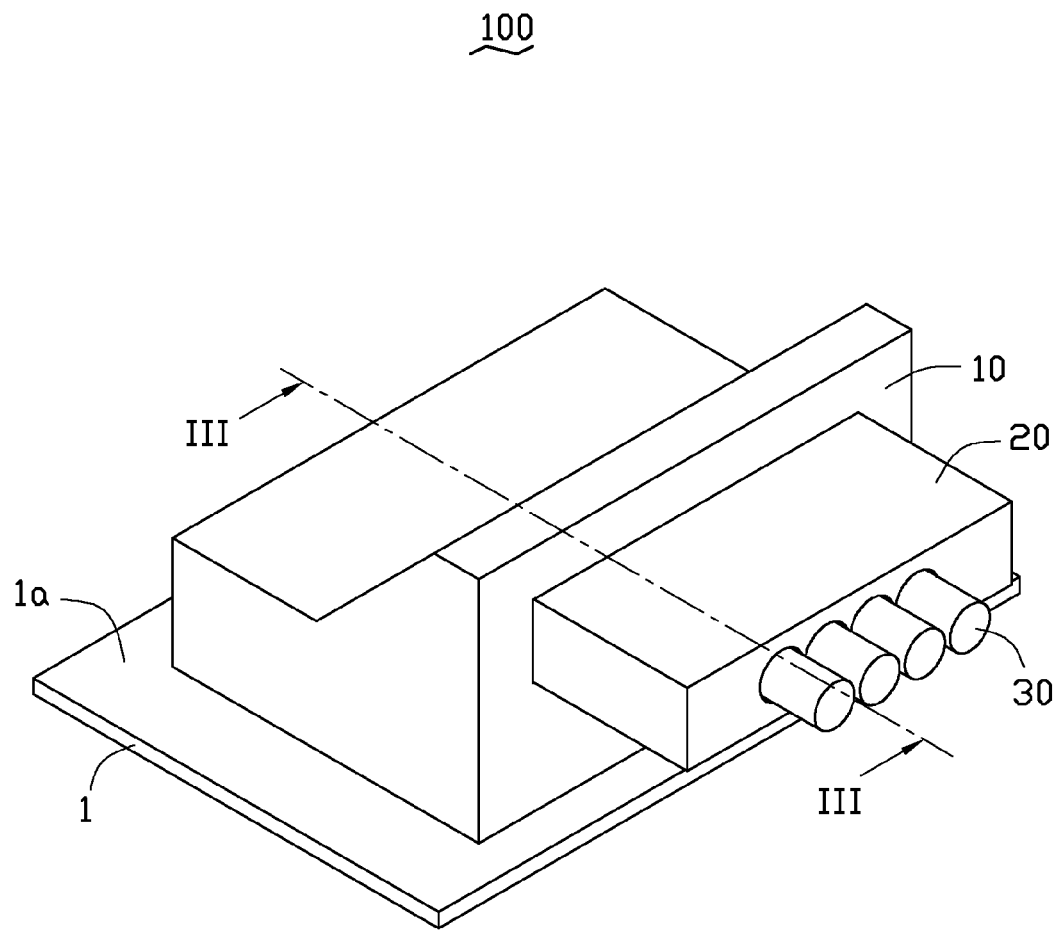
FIG. 1 is an assembled, isometric view of an optical connector, according to an exemplary embodiment.
Figure 2:
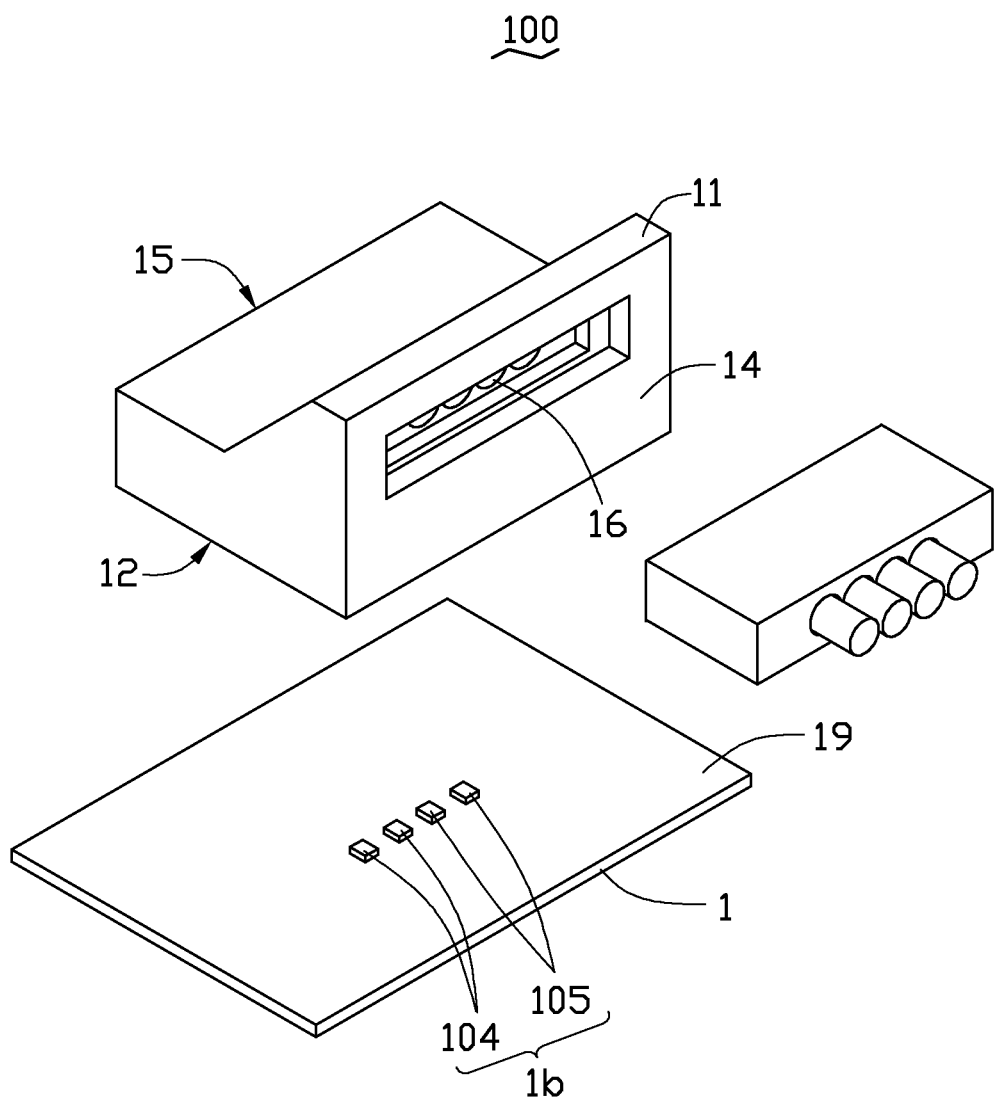
FIG. 2 is an exploded, isometric view of the optical connector of FIG. 1.
Figure 3:
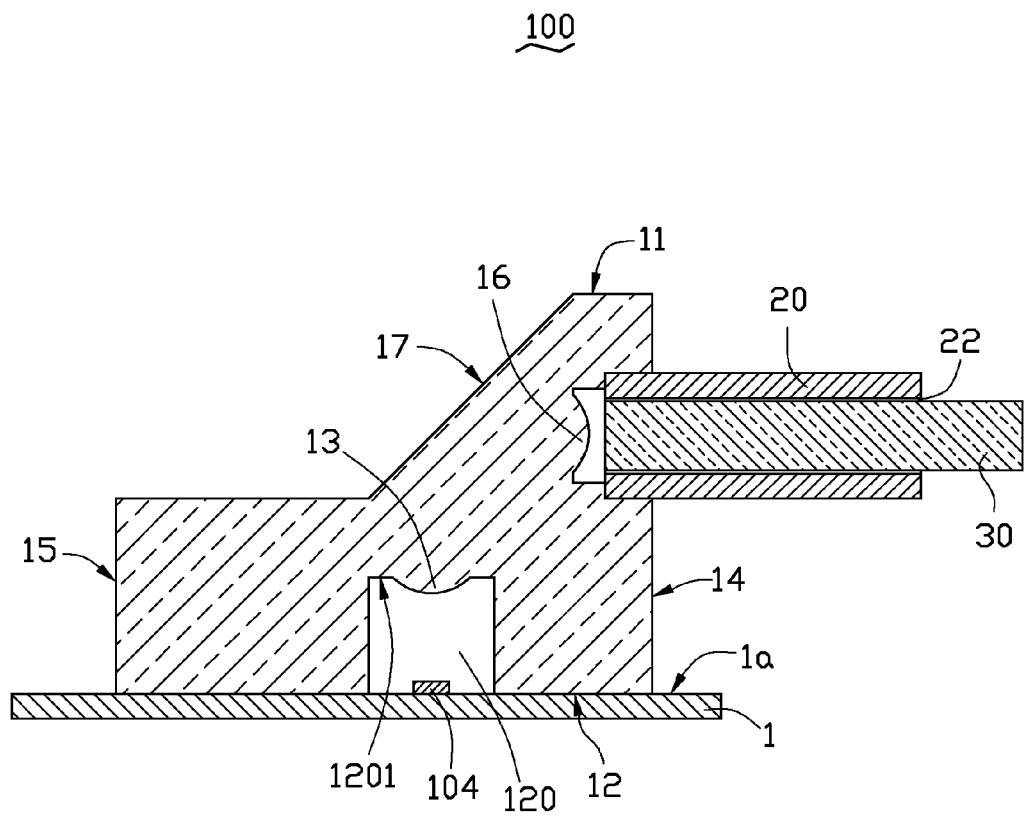
FIG. 3 is a cross-sectional view taken along line of FIG. 1.
Figure 4:
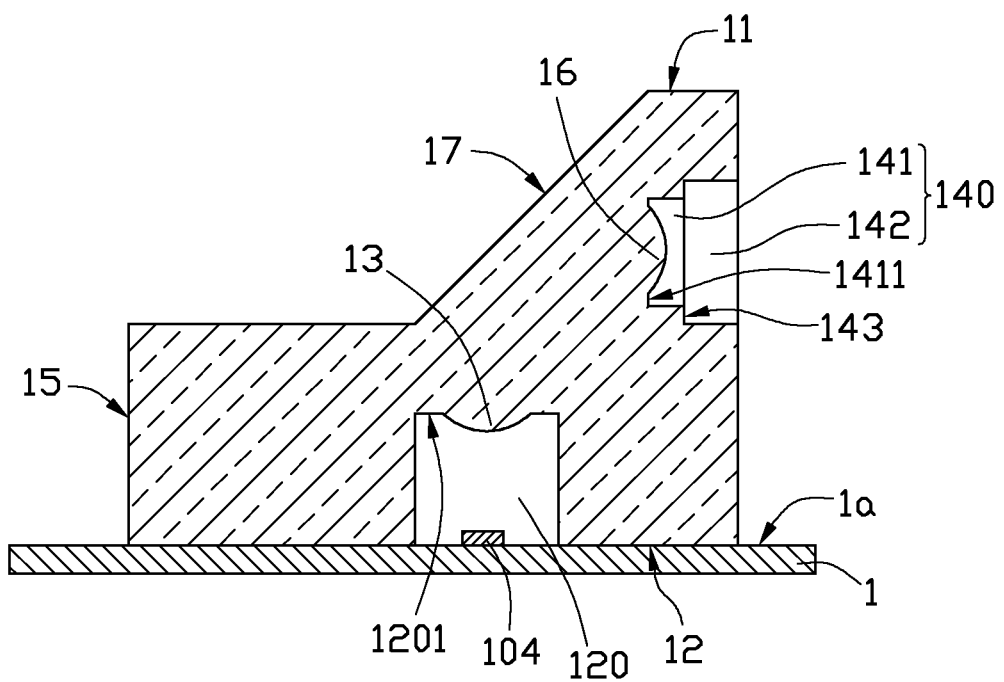
FIG. 4 is a cross-sectional view of a printed circuit board together with an optical-electric coupling element.

FIGS. 1-4 show an optical connector 100, according to an embodiment. The optical connector 100 includes a printed circuit board (PCB) 1, an optical-electric coupling element 10, a jumper 20 and four optical fibers 30. The optical-electric coupling element 10 is positioned on the PCB 1. The jumper 20 is detachably connected to the optical-electric coupling element 10. The four optical fibers 30 are received in the jumper 20.

The PCB 1 includes a supporting surface 1a. A photoelectric conversion module 1b is positioned on the supporting surface 1a and electrically connected to the PCB 1. The photoelectric conversion module 1b includes four photoelectric conversion chips, such as two laser diodes 104 and two photo diodes 105. The PCB 1 contains various circuits (not shown) that connect with the photo electric conversion module 1b, to drive the laser diodes 104 to emit light according to input for transmitting the input data, and for the demodulation of data in the light received by the photo diodes 105.

The optical-electric coupling element 10 includes an upper surface 11 and a lower surface 12 facing away from the upper surface 11. The upper surface 11 is substantially parallel with the lower surface 12. The optical-electric coupling element 10 defines a first cavity 120 in the lower surface 12. A bottom portion 1201 of the first cavity 120 forms four first coupling lenses 13. In the embodiment, all of the first coupling lenses 13 are convex lenses and are integrally formed with the optical-electric coupling element 10. The lower surface 12 is positioned on the supporting surface 1a of the PCB 1, with each of the coupling lens 13 aligning with a laser diode 104 or a photo diode 105.

The optical-electric coupling element 10 also includes a first external sidewall 14 and a second external sidewall 15 facing away from the first external sidewall 14. The first external sidewall 14 is substantially parallel with the second external sidewall 15. The lower surface 12 perpendicularly connects to both the first external surface 14 and the second external surface 15.

The upper surface 11 defines a sloped surface 17 extending from the upper surface 11 to the second external sidewall 15. The second external sidewall 15 and the sloped surface 17 define an angle therebetween. In the embodiment, the angle is about 45 degrees. An angle between an optical axis of each first coupling lens 13 and the sloped surface 17 is therefore about 45 degrees.

The optical-electric coupling element 10 defines a stepped receiving cavity 140 in the first external sidewall 14. The stepped receiving cavity 140 includes a first receiving cavity 141 and a second receiving cavity 142 communicating with the first receiving cavity 141. Both the first receiving cavity 141 and the second receiving cavity 142 are rectangular in shape. A width of the first receiving cavity 141 is smaller than a width of the second receiving cavity 142. As such, a stepped surface 143 is formed between the first receiving cavity 141 and the second receiving cavity 142. A bottom surface 1411 of the second receiving cavity 142 forms four second coupling lenses 16. In the embodiment, all of the second coupling lenses 16 are convex lenses and are integrally formed with the optical-electric coupling element 10. Each of the second coupling lenses 16 corresponds to a respective one of the first coupling lenses 13. A distance between the stepped surface 143 and the bottom surface 1411 is greater than a thickness of each second coupling lens 16. In other words, a depth of the first receiving cavity 141 is greater than the thickness of the each second coupling lens 16, and each second coupling lens 16 and the stepped surface 143 are spaced by a distance. An angle between the sloped surface 17 and an optical axis of each second coupling lens 16 is about 45 degrees.

A shape and a size of the jumper 20 are respectively corresponds with a shape and a size of the second receiving cavity 142. In the embodiment, the jumper 20 is rectangular in shape. The jumper 20 is detachably receiving in the second receiving cavity 142 and insertion is limited by the stepped surface 143.

The jumper 20 defines four receiving holes 22 for receiving the four optical fibers 30. The optical fibers 30 are thus positioned above and substantially parallel with the PCB 1, and correspond to the photoelectric conversion chips.

In use, light emitted from the two laser diodes 104 is directed into the optical-electric coupling element 10 by two of the first coupling lenses 13, then directed into the jumper 20 by two of the second coupling lenses 28, the light path is bent about 90 degrees by the sloped surface 17. In the embodiment, two of the optical fibers 30 are positioned on the light path reflected by the sloped surface 17 from the laser diodes 104. As such, the light is finally reflected into the two optical fibers 30 by the sloped surface 17. A process of the photo diodes 105 receiving light is the reverse to that of the laser diodes 104 emitting light.

In other embodiments, the numbers of the laser diodes 104, the photo diodes 105, the first coupling lenses 13, the second coupling lenses 16 and the optical fibers 30 can be changed depending on need.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical connector, comprising:
a printed circuit board (PCB) comprising a supporting surface, at least one laser diode, and at least one photo diode, the at least one laser diode and the at least one photo diode positioned on the supporting surface;
an optical-electric coupling element positioned on the PCB and receiving the at least one laser diode and the at least one photo diode, the optical-electric coupling element comprising at least two first coupling lenses, all of the at least two first coupling lenses being convex lenses and integrally formed with the optical-electric coupling element, each of the at least two first coupling lenses aligning with a respective one of the at least one laser diode and the at least one photo diode, the optical-electric coupling element comprising an upper surface, a lower surface facing away from the upper surface, a first external sidewall, and a second external sidewall facing away from the first external sidewall, and a sloped surface extending from the upper surface toward the second external sidewall, the upper surface and the sloped surface forming an angle therebetween, the optical-electric coupling element defining a stepped receiving cavity in the first external sidewall, the optical-electric coupling element comprising at least two second coupling lenses on a bottom surface of the stepped receiving cavity;
a jumper detachably received in the stepped receiving cavity, and defining at least two receiving holes; and
at least two optical fibers, each of the at least two optical fibers received in a respective one of the at least two receiving holes and aligned with a respective one of the least two second coupling lenses.

2. The optical connector of claim 1, wherein the optical-electric coupling element defines a first cavity in the lower surface, the at least two first coupling lenses are positioned on a bottom portion of the first cavity, and the lower surface is positioned on the supporting surface.

3. The optical connector of claim 1, wherein the upper surface is substantially parallel with the lower surface, the first external sidewall is substantially parallel with the second external sidewall, and the lower surface perpendicularly connects to both the first external sidewall and the second external sidewall.

4. The optical connector of claim 1, wherein all of the at least two second coupling lenses are convex lenses and integrally formed with the optical-electric coupling element.

5. The optical connector of claim 1, wherein the angle is about 45 degrees.

6. The optical connector of claim 5, wherein an angle between an optical axis of each first coupling lens and the sloped surface is about 45 degrees, and an angle between an optical axis of each second coupling lens and the sloped surface is also about 45 degrees.

7. The optical connector of claim 1, wherein the at least two optical fibers are positioned above and substantially parallel with the PCB.

8. The optical connector of claim 1, wherein the stepped receiving cavity comprises a first receiving cavity and a second receiving cavity communicating with the first receiving cavity, both the first receiving cavity and the second receiving cavity are rectangular in shape, a width of the first receiving cavity is smaller than a width of the second receiving cavity, whereby a stepped surface is formed between the first receiving cavity and the second receiving cavity, and the stepped surface touches the jumper.

9. The optical connector of claim 8, wherein a distance between the stepped surface and the bottom surface is greater than a thickness of each second coupling lens, and each second coupling lens and the stepped surface are spaced by a distance.

10. The optical connector of claim 9, wherein a shape and a size of the jumper are respectively corresponding with a shape and a size of the second receiving cavity, the jumper is detachably received in the second receiving cavity, and the insertion of the jumper is limited by the stepped surface.

* * * * *